(12) United States Patent
Shrivastava et al.

(10) Patent No.: US 11,507,593 B2
(45) Date of Patent: Nov. 22, 2022

(54) SYSTEM AND METHOD FOR GENERATING QUERYEABLE STRUCTURED DOCUMENT FROM AN UNSTRUCTURED DOCUMENT USING MACHINE LEARNING

(71) Applicant: INTERNATIONAL INSTITUTE OF INFORMATION TECHNOLOGY, HYDERABAD, Hyderabad (IN)

(72) Inventors: Manish Shrivastava, Hyderabad (IN); Vishnu Ramesh, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 197 days.

(21) Appl. No.: 17/078,005

(22) Filed: Oct. 22, 2020

(65) Prior Publication Data
US 2021/0117438 A1    Apr. 22, 2021

(30) Foreign Application Priority Data
Oct. 22, 2019    (IN) .............................. 201941042926

(51) Int. Cl.
*G06F 16/25* (2019.01)
*G06F 16/2457* (2019.01)
*G06N 20/00* (2019.01)

(52) U.S. Cl.
CPC ...... *G06F 16/258* (2019.01); *G06F 16/24578* (2019.01); *G06N 20/00* (2019.01)

(58) Field of Classification Search
CPC .... G06F 16/258; G06F 16/1794; G06F 16/93; G06F 16/24578; G06N 20/00
See application file for complete search history.

(56) References Cited

U.S. PATENT DOCUMENTS 8,910,039 B2 * 12/2014 Leguin .................... G06F 40/10
715/234

* cited by examiner

*Primary Examiner* — Hau H Hoang

(57) ABSTRACT

A system for generating a queryable structured document from an unstructured document using a machine learning model is provided. The system (i) identifies breakpoints in the unstructured document, (ii) segments the unstructured document into one or more fragments based on identified breakpoints, (iii) classifies the one or more fragments as one or more title fragments or one or more non-title fragments based on a sequence of a position of words used in each fragment of the one or more fragments, (iv) constructs a data tree using the one or more title fragments and the one or more non-title fragments as a node of the data tree; (v) assigns one or more vectors to each node of the data tree, and (vi) generates a structured document by providing matrix representation for each node of the data tree.

17 Claims, 14 Drawing Sheets

SYSTEM AND METHOD FOR GENERATING QUERYEABLE STRUCTURED DOCUMENT FROM AN UNSTRUCTURED DOCUMENT USING MACHINE LEARNING

CROSS-REFERENCE TO RELATED APPLICATIONS

This patent application claims priority to Indian provisional patent application no: 201941042926 filed on Oct. 22, 2019, the complete disclosures of which, in their entirety, are hereby incorporated by reference.

TECHNICAL FIELD

The embodiments herein generally relate to generation of structured documents, and, more particularly, to a system and method for generating a structured document from an unstructured document using a machine learning model.

DESCRIPTION OF THE RELATED ART

In large documents, accessing desirable information is difficult and time-consuming. If there is no search option using keywords or phrases, then it becomes strenuous work for a user for which he or she might be looking for. If the user is in need to access a small part of the information in the larger documents, then it might take a lot of time to search in the larger documents.

Considerable efforts are made to easier problems of accessing the larger documents. Existing approaches focus on keyword search, which involves submission of query term(s) as a set of keywords by the user to receive a ranked list of documents (or references to the documents) from a document collection based on relevance to the query term(s). However, the keyword search may provide irrelevant results as it is matching only the keywords with the document collection.

Some of the existing approaches use a metric space search which includes building a tree data structure. The metric space search involves comparing a query point to data elements in metric space point(s) similar to the query point. During the building of the tree data structure, nodes on one level of the tree data structure may be permitted to overlap on another node which contains mutual data points. Due to the overlap of the data points, search results may not be relevant to the query point. The time taken to output search results might be high.

Further, the existing approaches include searching the tree data structure, one level at a time in a breadth-first manner, to locate several nearest data elements to the query point and generating a list of nearest data elements during the searching. Then, the existing approaches use the list of nearest data elements to determine whether a portion of the tree data structure is to be searched, and pruning the tree if it is determined that the portion should not be searched. Due to pruning the portion of the tree data structure, a relevant list of data elements may be missed during the searching. Hence, accuracy in finding the nearest data elements to the query point may be decreased.

Therefore, there arises a need to address the aforementioned technical drawbacks in existing technologies in generating a structured document.

SUMMARY

In view of foregoing an embodiment herein provides a processor-implemented method for generating a queryable structured document from an unstructured document. The method includes identifying, using an identifier, breakpoints in the unstructured document, based on one or more split points in the unstructured document, the one or more split points include at least one of (i) a new line symbol or (ii) a punctuation mark. The method includes segmenting the unstructured document into one or more fragments based on identified breakpoints. The method includes classifying, using a classifier, the one or more fragments as one or more title fragments, or one or more non-title fragments based on a sequence of a position of words in each fragment of the one or more fragments. The method includes constructing a data tree using the one or more title fragments and the one or more non-title fragments as a node of the data tree based on an order of the one or more title fragments and the one or more non-title fragments in the unstructured document and an importance score of each of the one or more title fragments. The method includes assigning one or more vectors to each node of the data tree, using a machine learning model, based on an importance of each word and a sequence of words in each node of the data tree. The method includes generating the structured document by providing matrix representation for each node of the data tree by arranging, using the machine learning model, the one or more vectors of each node of the data tree. The structured document is in queryable format.

In an embodiment, the method further includes querying the structured document, by (i) generating a query data tree matrix for an input query from a user; (ii) correlating the query data tree matrix with a matrix representation of each node of the structured document, (ii) assigning similarity scores to the each node of the structured document that is correlated to the query data tree matrix; (iii) ranking each node of the structured document that is correlated with the query data tree matrix based on assigned similarity scores; and (iv) providing a top-ranked node of the structured document that is correlated with the query data tree matrix as a result to the input query.

In yet another embodiment, the method further includes comparing, using a similarity score function, a vector of the query data tree matrix and the one or more vectors of each node of the data tree of the structured document for enabling ranking. The similarity score function may be a cosine distance function.

In yet another embodiment, the method further includes executing the unstructured document to obtain the one or more split points for identification of the breakpoints in the unstructured document.

In yet another embodiment, each node of the structured document includes a value attribute, and a vector attribute. The value attribute stores a word content of at least one title fragment or non-title fragment that is assigned to a given node of the structured document. The vector attribute stores a mathematical representation of the word content of the at least one title fragment or non-title fragment that is assigned to the given node of the structured document.

In yet another embodiment, the construction of the data tree includes (i) arranging the one or more fragments in a same order as the one or more fragments present in the unstructured document, (ii) assigning the one or more non-title fragments that are present after a given title fragment as children to the given title fragment; (iii) assigning an importance score to the one or more title fragments based on a word content in the one or more title fragments, and (iv) assigning a title fragment with a higher importance score as parent of the one or more title fragment with a lower importance score.

In yet another embodiment, the method further includes removing a word content that is associated with a header and a footer of the unstructured document, in the at least one node of the data tree based on one or more words and filtering a list of words that are present in each node of the data tree after removing the word content associated with the header and the footer of the unstructured document, to identify the importance of each word in each node of the data tree.

In yet another embodiment, the method further includes creating the one or more vectors to each node of the data tree by (i) identifying the importance of each word of a sentence in each node of the data tree, (ii) determining the one or more vectors based on the sequence of words and the importance of each word of the sentence and a meaning of the sentence using the machine learning model.

In one aspect, there is provided one or more non-transitory computer-readable storage medium storing the one or more sequence of instructions, which when executed by the one or more processors, causes to perform a method of automatically generating a queryable structured document from an unstructured document. The method includes identifying, using an identifier, breakpoints in the unstructured document, based on one or more split points in the unstructured document, the one or more split points include at least one of (i) a new line symbol or (ii) a punctuation mark. The method includes segmenting the unstructured document into one or more fragments based on identified breakpoints. The method includes classifying, using a classifier, the one or more fragments as one or more title fragments, or one or more non-title fragments based on a sequence of a position of words in each fragment of the one or more fragments. The method includes constructing a data tree using the one or more title fragments and the one or more non-title fragments as a node of the data tree based on an order of the one or more title fragments and the one or more non-title fragments in the unstructured document and an importance score of each of the one or more title fragments. The method includes assigning one or more vectors to each node of the data tree, using a machine learning model, based on an importance of each word and sequence of words in each node of the data tree. The method includes generating the structured document by providing matrix representation for each node of the data tree by arranging, using the machine learning model, the one or more vectors of each node of the data tree. The structured document is in queryable format.

In another aspect, there is provided a system for generating a queryable structured document from an unstructured document automatically. The system includes a device processor and a non-transitory computer-readable storage medium storing one or more sequences of instructions, which when executed by the device processor causes the steps of: (i) identifying, using an identifier, breakpoints in the unstructured document, based on one or more split points in the unstructured document, the one or more split points include at least one of (i) a new line symbol or (ii) a punctuation mark; (ii) segmenting the unstructured document into one or more fragments based on the identified break points; (iii) classifying, using a classifier, the one or more fragments as one or more title fragments or one or more non-title fragments based on a sequence of a position of words in each fragment of the one or more fragments; (iv) constructing a data tree the one or more title fragments and the one or more non-title fragments as a node of the data tree based on an order of the one or more title fragments and the one or more non-title fragments in the unstructured document and an importance score of each of the one or more title fragments; (v) assigning one or more vectors to each node of the data tree, using a machine learning model, based on an importance of each word and sequence of words in each node of the data tree; and (vi) generating the structured document by providing matrix representation for each node of the data tree by arranging, using the machine learning model, the one or more vectors of the each node of the data tree, the structured document is in queryable format.

In an embodiment, the system further performs querying the structured document, by (i) generating a query data tree matrix for an input query from a user; (ii) correlating the query data tree matrix with a matrix representation of each node of the structured document, (ii) assigning similarity scores to the each node of the structured document that is correlated to the query data tree matrix; (iii) ranking each node of the structured document that is correlated with the query data tree matrix based on assigned similarity scores; and (iv) providing a top-ranked node of the structured document that is correlated with the query data tree matrix as a result to the input query.

In yet another embodiment, the system further compares, using a similarity score function, a vector of the query data tree matrix and the one or more vectors of each node of the data tree of the structured document for enabling ranking, wherein the similarity score function is a cosine distance function.

In yet another embodiment, the system further includes executing the unstructured document to obtain the one or more split points for identification of the breakpoints in the unstructured document.

In yet another embodiment, each node of the structured document includes a value attribute, and a vector attribute. The value attribute stores a word content of at least one title fragment or non-title fragment that is assigned to a given node of the structured document. The vector attribute stores a mathematical representation of the data of the at least one title fragment or non-title fragment that is assigned to the given node of the structured document.

In yet another embodiment, the construction of the data tree includes (i) arranging the one or more fragments in a same order as the one or more fragments present in the unstructured document; (ii) assigning the one or more non-title fragments that are present after a given title fragment as children to the given title fragment; (iii) assigning the importance score to the one or more title fragments based on a word content in the one or more title fragments; and (iv) assigning a title fragment with a higher importance score as parents of the one or more title fragment with a lower importance score.

In yet another embodiment, the system further removes a word content that is associated with a header and a footer of the unstructured document, in the at least one node of the data tree based on one or more words and filters a list of words that are present in each node of the data tree after removing the word content associated with the header and the footer of the unstructured document, to identify the importance of each word in each node of the data tree.

In yet another embodiment, the system further includes creating the one or more vectors to each node of the data tree by (i) identifying the importance of each word of a sentence in the at least one node of the data tree, (ii) determining the one or more vectors based on the sequence of words and the importance of each word of the sentence and a meaning of the sentence using the machine learning model.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
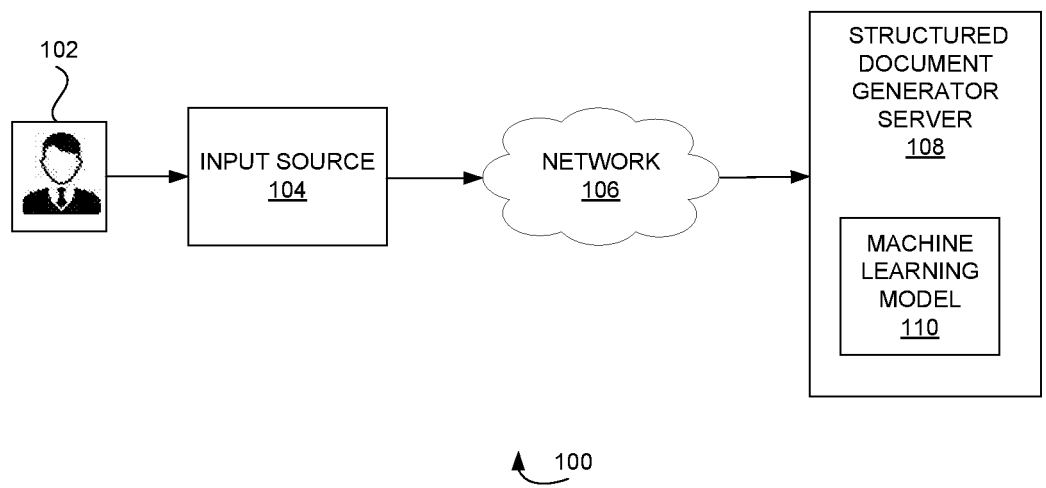
FIG. 1 illustrates a block diagram of a system that generates a structured document in a queryable format from an unstructured document according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for generating a structured document in a queryable format from an unstructured document using a machine learning model. Referring now to the drawings, and more particularly to FIGS. 1 through 12, where similar reference characters denote corresponding features consistently throughout the figures, there are shown preferred embodiments.

Unstructured documents are documents that may be free-form and don't have a set structure but are still able to be scanned, captured, and imported, for example, contracts. letters.

A structured document is an electronic document where some method of markup is used to identify the whole and parts of the document as having various meanings beyond their formatting.

Vector representation for words represents the meaning of a word in vector notation.

FIG. 1 illustrates a block diagram of a system 100 that generates a structured document in a queryable format from an unstructured document according to an embodiment herein. The system 100 includes an input source 104, and a structured document generator server 108 that includes a machine learning model 110. The input source 104 may be associated with a user 102. The input source 104 includes a user interface to obtain inputs from the user 102 that may include at least one of the unstructured document to be analyzed to generate the structured document or an input query. The input source 104 includes, but is not limited to, a handheld device, a mobile phone, a kindle, a Personal Digital Assistant (PDA), a tablet, a laptop, a music player, a computer, an electronic notebook, or a smartphone and the like. The structured document generator server 108 includes and a device processor and a non-transitory computer-readable storage medium storing one or more sequences of instructions, which when executed by the device processor causes the generation of the structured document from the unstructured document. The structured document generator server 108 may receive the unstructured document from the input source 104 through a network 106. The structured document generator server 108 may receive the unstructured document from any other source that comprises the unstructured document. The unstructured document may be given to the structured document generator server 108 through a user interface element of the structured document generator server 108. The network 106 includes, but is not limited to, a wireless network, a wired network, a combination of the wired network and the wireless network or Internet, and the like. The unstructured document includes, but is not limited to, legal documents, user manuals, patient history repositories, documents related to drugs, research papers, etc. In some embodiments, the system 100 may include an application that may be installed in android based devices, windows-based devices, or any such mobile operating systems devices for generating the queryable structured document from the unstructured document.

The structured document generator server 108 identifies breakpoints in the unstructured document, using an identifier, based on one or more split points in the unstructured document. The unstructured document includes one or more sentences. The one or more sentences may end with either punctuation marks or newline symbols that are considered as the one or more split points. The structured document generator server 108 executes the unstructured document to obtain the one or more split points for identification of the breakpoints in the unstructured document. The structured document generator server 108 segments the unstructured document into one or more fragments based on the identified breakpoints.

The structured document generator server 108 classifies the one or more fragments as one or more title fragments or one or more non-title fragments based on a sequence of a position of words used in each fragment of the one or more fragments. The structured document generator server 108 classifies the one or more fragments using a title classifier.

The structured document generator server 108 constructs a data tree using the one or more title fragments and the one or more non-title fragments as a node of the data tree based on an order of the one or more title fragments and the one or more non-title fragments in the unstructured document and an importance score of each of the one or more title fragments.

The structured document generator server 108 assigns one or more vectors to each node of the data tree based on an importance of each word and a sequence of words in each node of the data tree using the machine learning model 110. Each node of the unstructured document includes a vector attribute and a value attribute. The value attribute stores a word content of at least one title fragment or non-title fragment that is assigned to a given node of the structured document. The vector attribute stores a mathematical representation of the word content of the at least one title fragment or non-title fragment that is assigned to the given node of the structured document.

The structured document generator server 108 arranges the one or more vectors of each node of the data tree to provide a matrix representation to each node using the machine learning model 110. Each node of the data tree is represented as matrices.

The structured document generator server 108 generates the structured document in a queryable format based on the matrix representation of each node of the data tree.

The structured document generator server 108 queries the structured document by (i) generating a query data tree matrix for the input query from the user 102, (ii) correlating the query data tree matrix with the matrix representation of each node of the structured document, (ii) assigning similarity scores to the each node of the structured document that is correlated to the query data tree matrix, (iii) ranking each node of the structured document that is correlated with the query data tree matrix based on assigned similarity scores, and (iv) providing a top-ranked node of the structured document that is correlated with the query data tree matrix as a result to the input query.

In some embodiments, the machine learning model 110 is trained with the importance of each word and a sequence of words in each node of the data tree.

Figure 2A:
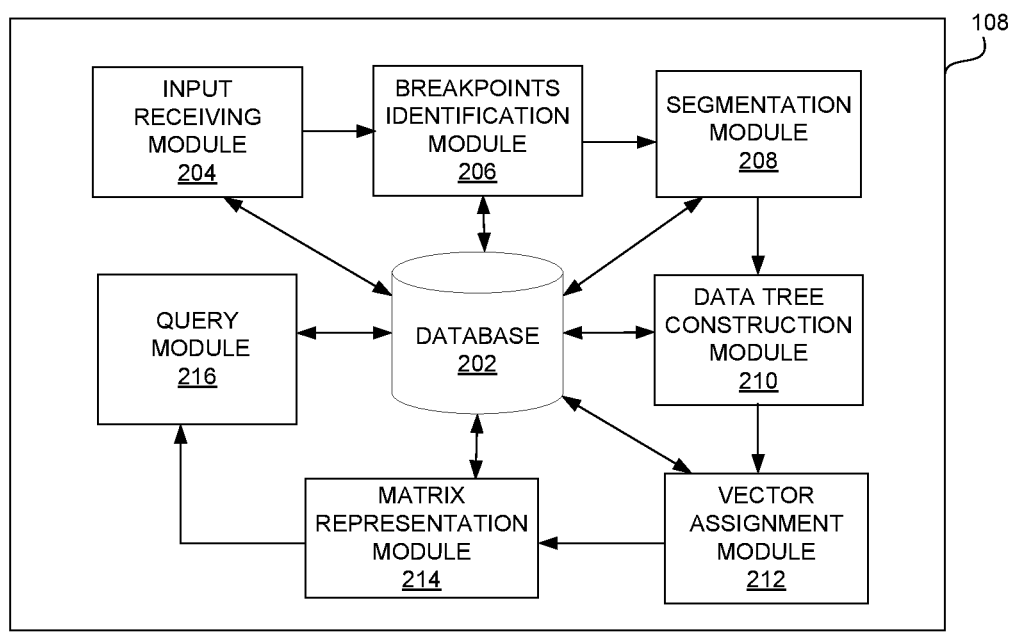
FIG. 2A is an exploded view of a structured document generator server of FIG. 1 according to an embodiment herein.

FIG. 2A is an exploded view of the structured document generator server 108 of FIG. 1 according to an embodiment herein. The structured document generator server 108 includes a database 202, an input receiving module 204, breakpoints identification module 206, a segmentation module 208, a data tree construction module 210, a vector assignment module 212, a matrix representation module 214, and a query module 216. The input receiving module 204 receives the unstructured document to be analyzed to generate the structured document or the input query.

The breakpoints identification module 206 identifies the breakpoints in the unstructured document, using the identifier, based on one or more split points. The unstructured document includes the one or more sentences. The one or more sentences may end with either punctuation marks or newline symbols. In some embodiments, the one or more split points are obtained based on punctuation marks, or newline symbols on the one or more sentences. The breakpoints identification module 206 executes the unstructured document to obtain the one or more split points for the identification of the breakpoints in the unstructured document. The segmentation module 208 segments the unstructured document into the one or more fragments based on the identified breakpoints. The segmentation module 208 classifies the one or more fragments as the one or more title fragments or the one or more non-title fragments based on the sequence of the position of words used in each fragment of the one or more fragments. The segmentation module 208 classifies the one or more fragments using the title classifier. The one or more title fragments or one or more non-title fragments may be, for example, "TITLE1", "TITLE2", "SENTENCE1", "SENTENCE2" respectively. A fragment in the unstructured document may be classified as a title fragment, for example, as "TITLE1". A fragment is classified as a non-title fragment, for example, as "SENTENCE2".

The data tree construction module 210 constructs the data tree using the one or more title fragments and the one or more non-title fragments as the node of the data tree based on the order of the one or more title fragments and the one or more non-title fragments in the unstructured document and the importance score of each of the one or more title fragments. In some embodiments, the data tree is constructed by (i) arranging the one or more fragments in the same order as the one or more fragments present in the unstructured document, for example, in the order "TITLE1", "SENTENCE2", "TITLE2" as present in the unstructured document, (ii) assigning the one or more non-title fragments that are present after a given title fragment as children to the given title fragment, for example, the non-title fragment "SENTENCE2" as a child to the title fragment "TITLE1", and (iii) assigning the importance score to the one or more title fragments based on the word content in the one or more title fragments, and (iv) assigning a title fragment with a higher importance score as a parent of the one or more title fragment with a lower importance score.

The vector assignment module 212 assigns the one or more vectors to each node of the data tree based on the order of the one or more title fragments and the one or more non-title fragments in the unstructured document and the importance score of each of the one or more title fragments using the machine learning model 110. The vector assignment module 212 creates the one or more vectors to each node by (i) identifying the importance of each word of the sentence of each node of the data tree, (ii) determining the one or more vectors based on the sequence of words and the importance of each word in the sentence and the meaning of the sentence using the machine learning model 110. Each node of the unstructured document includes a vector attribute and a value attribute. The value attribute stores a word content of at least one title fragment or non-title fragment that is assigned to a given node of the structured document. The vector attribute stores a mathematical representation of the word content of the at least one title fragment or non-title fragment that is assigned to the given node of the structured document. The vector assignment module 212 removes a word content that is associated with a header and a footer of the unstructured document, in the at least one node of the data tree based on one or more words and filters a list of words that are present in each node of the data tree after removing the word content associated with the header and the footer of the unstructured document, to identify the importance of each word in each node of the data tree. In some embodiments, filtration is done by removing one or more stop words.

The matrix representation module 214 provides matrix representation to each node of the data tree by arranging the one or more vectors of each node of the data tree to provide a matrix representation for each node using the machine learning model 110. Each node of the data tree is represented as matrices. For example, a matrix notation of the "TITLE1" is represented as the "TITLE1" matrix. A matrix notation of the "TITLE2" is represented as the "TITLE2" matrix. A matrix notation of the "SENTENCE1" is represented as the "SENTENCE1" matrix. A matrix notation of the "SENTENCE2" is represented as the "SENTENCE2" matrix. The matrix representation module 214 generates the structured document based on the matrix representation of each node of the data tree using the machine learning model 110.

The query module 216 queries the structured document by (i) generating a query data tree matrix for the input query from the user 102, (ii) correlating the query data tree matrix with the matrix representation of each node of the structured document, (ii) assigning the similarity scores to each node of the structured document that is correlated to the query data tree matrix, (iii) ranking each node of the structured document that is correlated with the query data tree matrix based on the assigned similarity scores, and (iv) providing the top-ranked node of the structured document that is correlated with the query data tree matrix as the result to the input query. The query module 216 compares using a similarity score function, a vector of the input query, and the one or more vectors of each node of the data tree of the structured document. The similarity score function is a cosine distance function. For example, the data tree of the structured document includes a root, a title1, a title2, a sentence1, a sentence2 as nodes. Based on the input query from the user 102, a data tree matrix associated with the input query is generated. The data tree matrix of the input query is represented as a query data tree matrix. The nodes of the data tree of the structured document are represented as matrices. The query data tree matrix is correlated with the matrices of the nodes of the data tree. Each node of the data tree of the structured document and the query matrix are assigned to similarity scores. The query data tree matrix is correlated with each node of the data tree and each node is ranked based on the assigned similarity scores. The top-ranked node of the data tree matrix, for example, sentence1 of the data tree matrix is provided as a result to the input query.

Figure 2B:
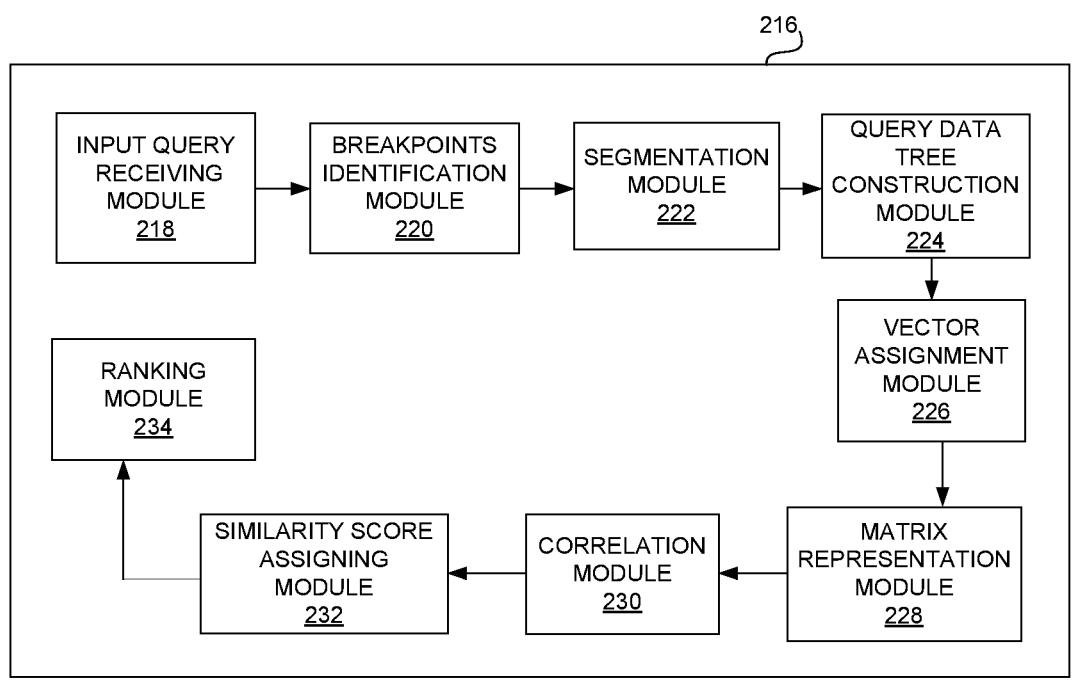
FIG. 2B is an exploded view of a query module of FIG. 2A according to an embodiment herein.

FIG. 2B is an exploded view of the query module 216 of FIG. 2A according to an embodiment herein. The query module 216 includes an input query receiving module 218, breakpoints identification module 220, a segmentation module 222, a query data tree construction module 224, a vector assignment module 226, a matrix representation module 228, a correlation module 230, a similarity score assigning module 232, and a ranking module 234. The input query receiving module 218 receives the input query from the user 102. The breakpoints identification module 220 identifies breakpoints in the input query using an identifier, based on one or more split points in the input query. The input query may include one or more sentences. The one or more sentences may end with either punctuation marks or newline symbols that are considered as the one or more split points. The breakpoints identification module 220 executes the input query to obtain the one or more split points for the identification of the breakpoints in the input query. The segmentation module 222 segments the input query into one or more fragments based on the identified breakpoints. The segmentation module 222 classifies the one or more fragments as one or more title fragments or one or more non-title fragments based on a sequence of a position of words used in each fragment of the one or more fragments. The segmentation module 222 classifies the one or more fragments using a title classifier. The query data tree construction module 224 constructs a query data tree using the one or more title fragments and the one or more non-title fragments as a node of the query data tree based on an order of the one or more title fragments and the one or more non-title fragments in the input query and an importance score of each of the one or more title fragments. The vector assignment module 226 assigns one or more vectors to a node of the query data tree based on an order of the one or more title fragments and the one or more non-title fragments in the input query and an importance score of each of the one or more title fragments using a machine learning model 110. The matrix representation module 228 provides matrix representation to each node of the query data tree by arranging the one or more vectors of each node of the query data tree using the machine learning model. The correlation module 230 correlating a query data tree matrix with the matrix representation of each node of the structured document. The similarity score assigning module 232 assigns the similarity scores to each node of the structured document that is correlated to the query data tree matrix. The ranking module 234 ranks each node of the structured document that is correlated with the query data tree matrix based on the assigned similarity scores. The ranking module 234 provides the top-ranked node of the structured document that is correlated with the query data tree matrix as the result of the input query.

Figure 3:
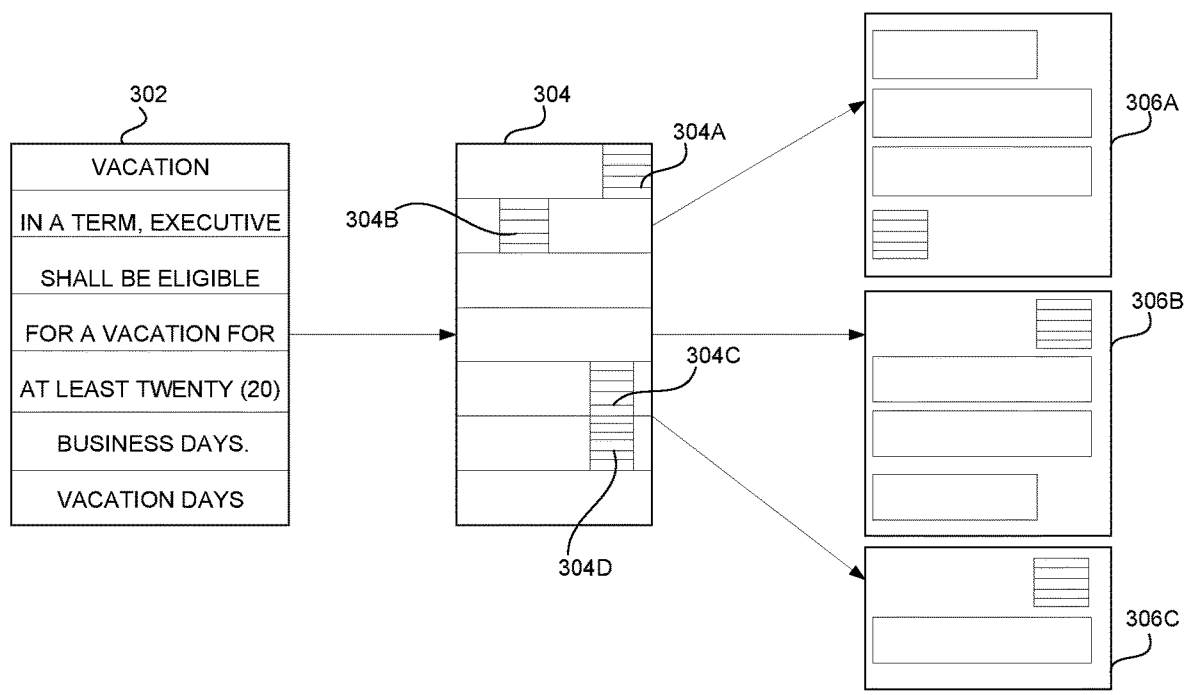
FIG. 3 is a schematic diagram that illustrates a segmentation of an unstructured document into one or more fragments according to an embodiment herein.

With reference to FIG. 1, FIG. 3 is a schematic diagram that illustrates a segmentation of the unstructured document into one or more fragments according to an embodiment herein. The schematic diagram includes an unstructured document 302, identified breakpoints in the unstructured document 304, and one or more fragments 306A-C. The structured document generator server 108 identifies breakpoints 304A, 304B, 304C, and 304D based on the one or more split points in the unstructured document 302. The identified breakpoints 304A, 304B, 304C, and 304D are shown in the shaded portion at 304. The unstructured document 302 may include period punctuation marks or newline symbols that are considered as the one or more split points. The structured document generator server 108 executes the unstructured document 302 to obtain the one or more split points. The structured document generator server 108 segments the unstructured document 302 into the one or more fragments 306A, 306B, and 306C based on the identified breakpoints in the unstructured document 304.

Figure 4:
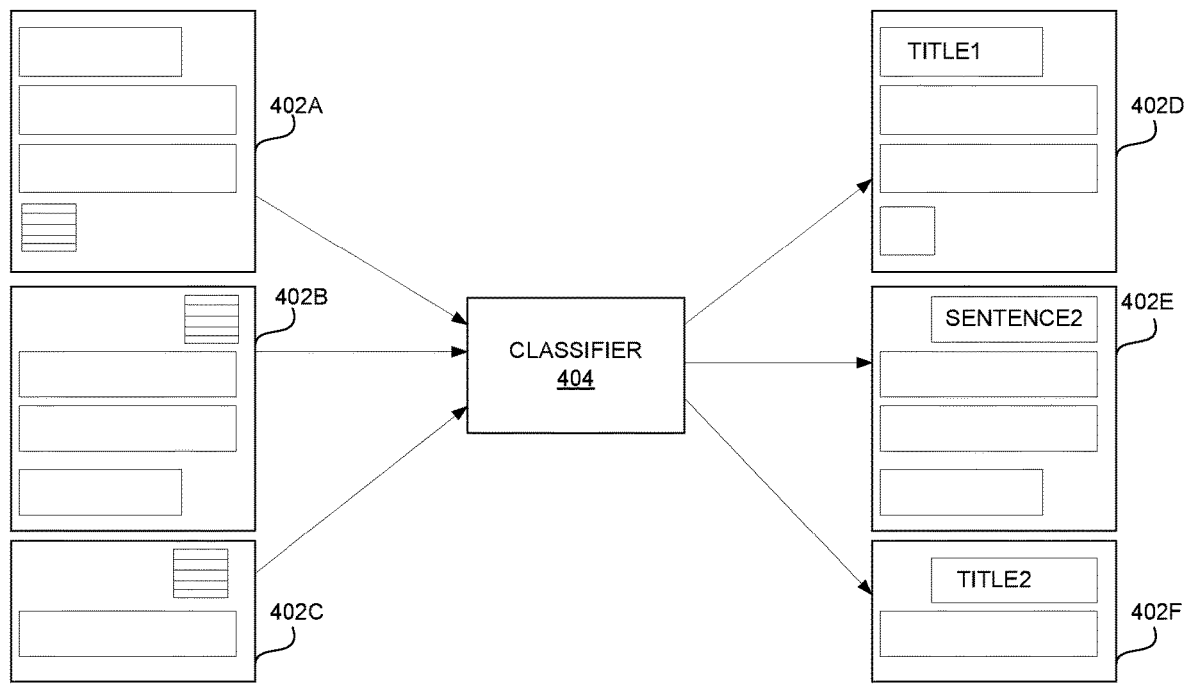
FIG. 4 is a schematic diagram that illustrates a classification of one or more fragments using a classifier according to an embodiment herein.

FIG. 4 is a schematic diagram that illustrates a classification of one or more fragments 402A, 402B, and 402C, using a classifier 404 according to an embodiment herein. The classifier 404 classifies the one or more fragments 402A, 402B, and 402C as a title fragment, or a non-title fragment based on a sequence of a position of words used in each fragment. A fragment 402A is classified as a title fragment 402D, for example, "TITLE1" as shown in FIG. 4. A fragment 402B is classified as a non-title fragment 402E, for example, "SENTENCE2" as shown in FIG. 4. A fragment 402C is classified as a title fragment 402F, for example, "TITLE2" as shown in FIG. 4.

Figure 5:
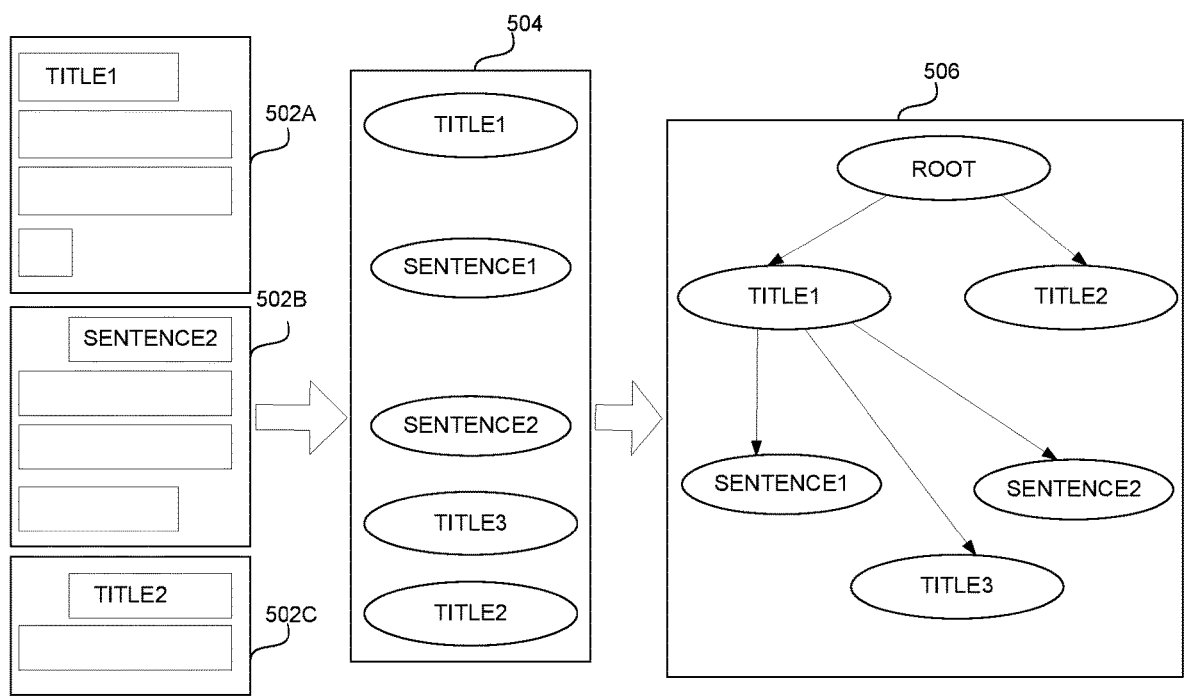
FIG. 5 is a schematic diagram that illustrates a construction of a data tree according to an embodiment herein.

FIG. 5 is a schematic diagram that illustrates a construction of a data tree 506 according to an embodiment herein. The schematic diagram includes title fragments 502A and 502C, a non-title fragment 502B, nodes of the data tree at 504, and the data tree 506. A title fragment 502A is represented as a node "TITLE1" at 504 as shown in FIG. 5. The non-title fragment 502B is represented as a node "SENTENCE2" at 504 as shown in FIG. 5. A title fragment 502C is represented as a node "TITLE2" at 504 as shown in FIG. 5. The data tree 506 is constructed by (i) arranging the title fragment 502A, the non-title fragment 502B, the title fragment 502C in a same order as present in the unstructured document, (ii) assigning the node "SENTENCE2" at 504 that is present after the node "TITLE1" at 504 as a child to the node "TITLE1", (iii) assigning an importance score to the title fragments 502A, and 502C based on a word content in the title fragments 502A, and 502C, and (iv) assigning a title fragment with a higher importance score, for example, the node of the title fragment 502A "TITLE1" as a parent of the node of the title fragment 502C, for example "TITLE3", with a lower importance score.

Figure 6:
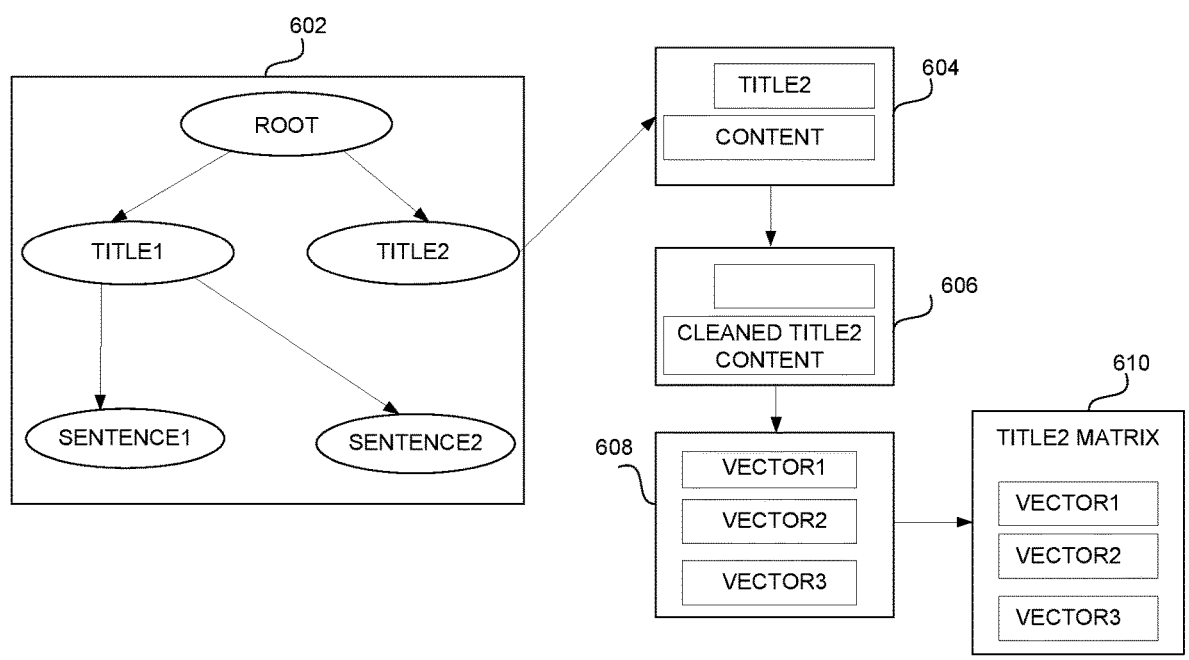
FIG. 6 is a schematic diagram that illustrates a matrix representation of a node of a data tree according to an embodiment herein.

With reference to FIG. 1, FIG. 6 is a schematic diagram that illustrates a matrix representation of nodes of a data tree according to an embodiment herein. The schematic diagram includes a data tree 602, a content of a title fragment 604, a cleaned content of the title fragment 606, an assigned vector of the title fragment 608, and a matrix representation of the title fragment 610. The data tree 602 includes title fragments such as "TITLE1", and "TITLE2" and the non-title fragments "SENTENCE1", and "SENTENCE2". For example, in FIG. 6, "TITLE2" has been taken for matrix representation. The content of the title fragment 604 includes a word content in the title fragment "TITLE2". The content of a title fragment 604 is cleaned to obtain a cleaned content of the title fragment 606 by removing a word content, for example, that is associated with the header and the footer of the unstructured document, present in the title fragment "TITLE2". The cleaned content of the title fragment 606 is filtered based on a list of words that are present in a title node. The cleaned content of the title fragment 606 is assigned with one or more vectors using a machine learning model, for example, "VECTOR1", "VECTOR2", "VECTOR3" as shown in FIG. 6 at 608. The matrix representation of the title fragment 610, "TITLE2 MATRIX", is obtained by stacking the one or more vectors of the title fragment one above the other using the machine learning model.

Figure 7:
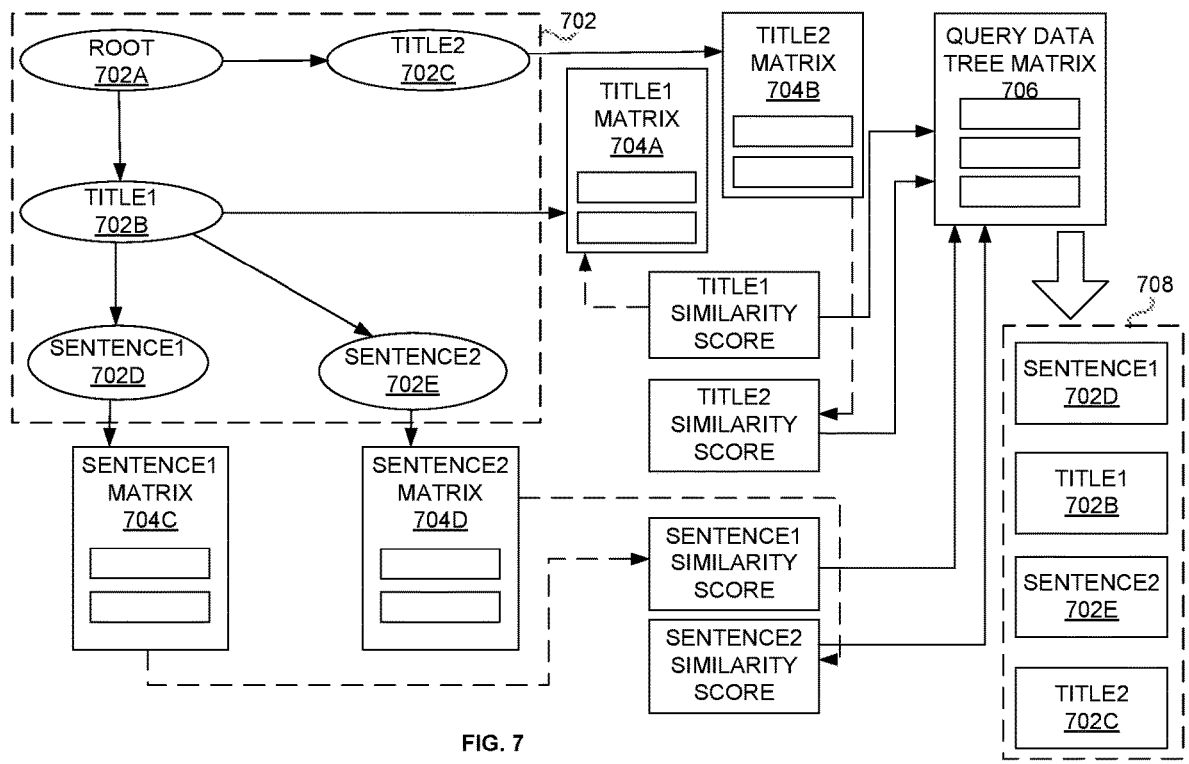
FIG. 7 is an exemplary representation of querying a structured document according to an embodiment herein.

FIG. 7 is an exemplary representation of querying a structured document according to an embodiment herein. The exemplary representation includes a data tree of a structured document 702 and matrix representation of each node 704A-D of the data tree of the structured document 702. The data tree of the structured document 702 includes a root 702A, a title1 702B, a title2 702C, a sentence1 702D, a sentence2 702E as nodes. Nodes of the data tree of the structured document 702 are represented as matrices. A matrix notation of the title1 702B is represented as a title1 matrix at 704A. A matrix notation of the title2 702C is represented as a title2 matrix at 704B. A matrix notation of the sentence1 702D is represented as a sentence1 matrix at 704C. A matrix notation of the sentence2 702E is represented as a sentence2 matrix at 704D. Based on an input query from a user, a query data tree matrix 706 is generated. The query data tree matrix 706 is correlated with the matrices of the nodes of the data tree of the structured document 702. Each node the title1 702B, the title2 702C, the sentence1 702D, the sentence2 702E of the data tree of the structured document 702, and the query data tree matrix 706 are assigned with similarity scores. A title1 similarity score is associated with the title1 matrix at 704A and the query data tree matrix 706. A title2 similarity score is associated with the title2 matrix at 704B and the query data tree matrix 706. A sentence1 similarity score is associated with the sentence1 matrix at 704C and the query data tree matrix 706. A sentence2 similarity score is associated with the sentence2 matrix at 704D and the query data tree matrix 706. Each node of the data tree of the structured document 702 that is correlated with the query data tree matrix 706 is ranked based on assigned similarity scores. Top-ranked node 708 of the data tree matrix is provided as a result to the input query.

Figure 8:
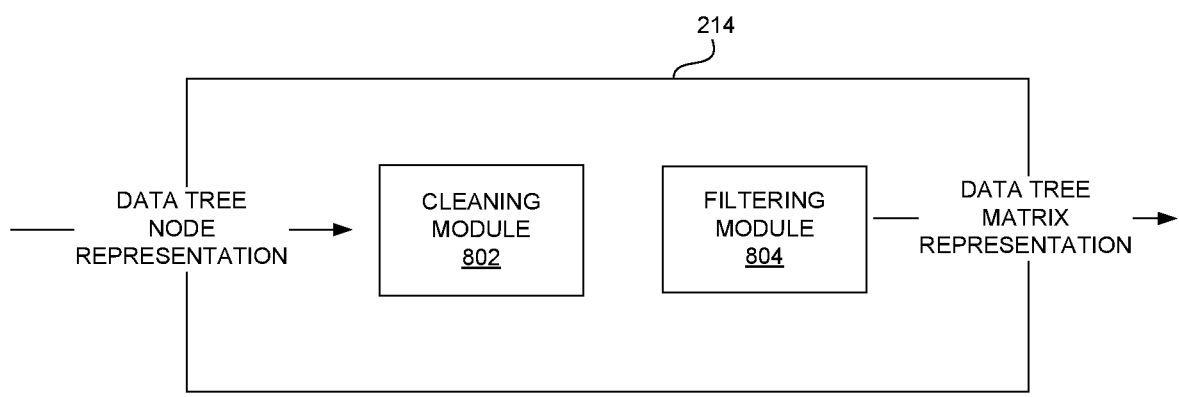
FIG. 8 is an exploded view of a representation module of FIG. 2A according to an embodiment herein.

FIG. 8 is an exploded view of a matrix representation module 214 of FIG. 2A according to an embodiment herein. The matrix representation module 214 includes a cleaning module 802, and a filtering module 804. The cleaning module 802 removes a word content that is associated with a header and a footer of the unstructured document, in the at least one node of the data tree based on one or more words. The filtering module 804 filters a list of words that are present in each node of the data tree after removing the word content associated with the header and the footer of the unstructured document, to identify the importance of each word in each node of the data tree. In some embodiments, filtration is done by removing one or more stop words.

Figure 9:
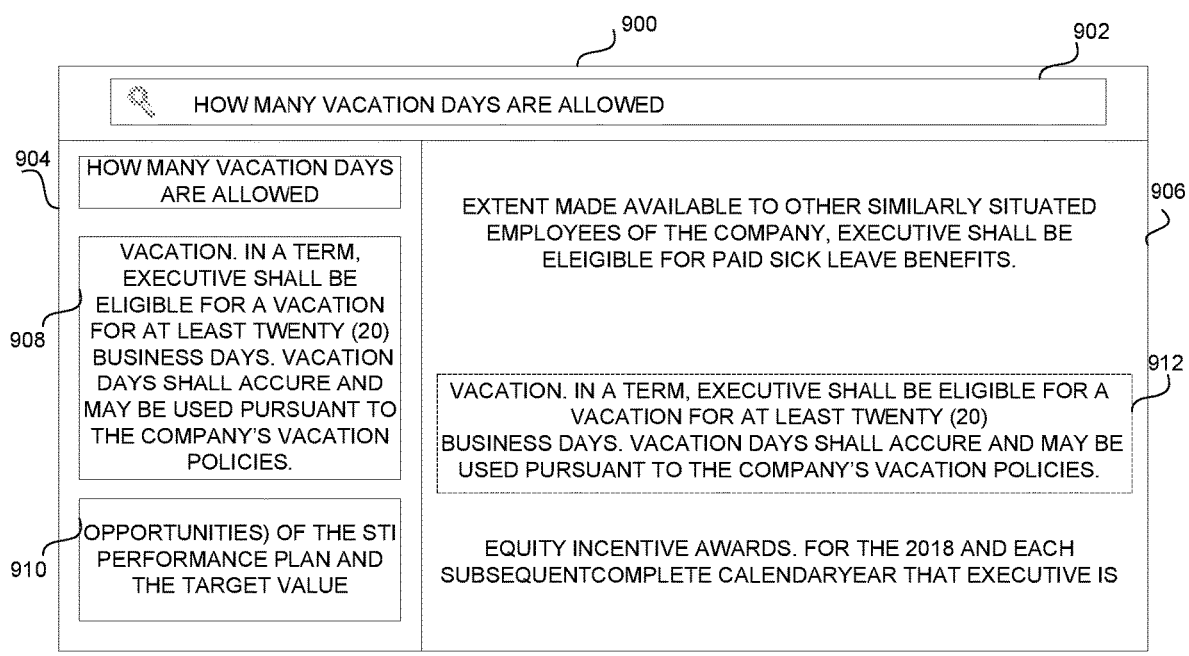
FIG. 9 is an exemplary representation of querying a structured document through a user interface according to an embodiment herein.
Figure 10A:
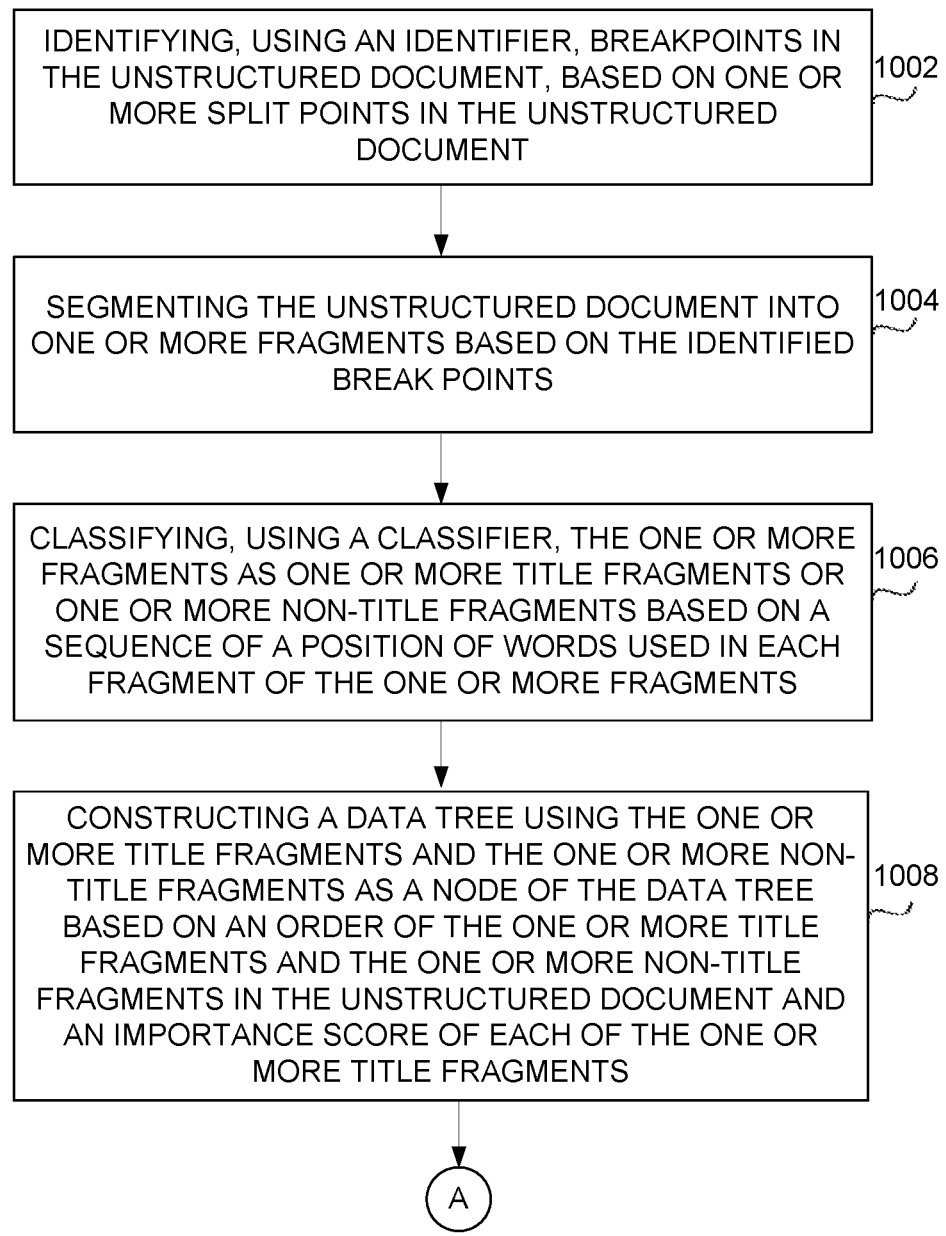
FIGS. 10A-10B are flow diagrams of a method for generating a structured document in a queryable format from an unstructured document according to an embodiment herein.
Figure 10B:
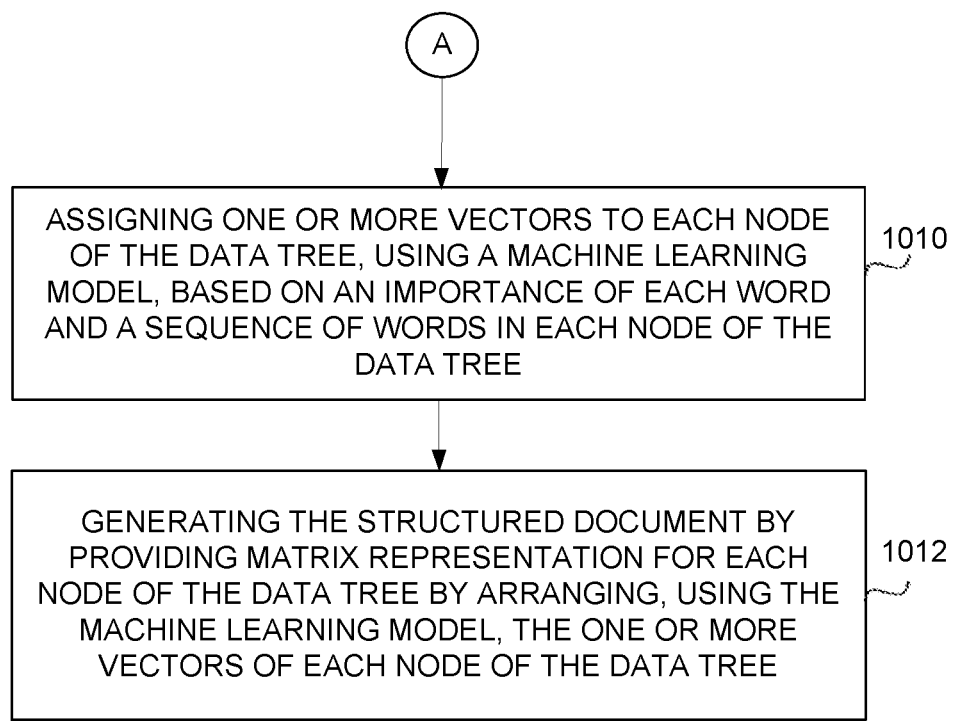

FIG. 9 is an exemplary representation of querying a structured document through a user interface 900 according to an embodiment herein. The user interface 900 includes a search field 902, a result panel 904, and a structured document panel 906. A user may provide an input query through the search field 902, for example, "HOW MANY VACATION DAYS ARE ALLOWED" as shown in FIG. 9. Top-ranked nodes 908, and 910 from a data tree of the structured document are shown in the result panel 904 in response to the input query by querying the structured document. A word content 912 of the top-ranked node 908 in the structured document is shown on the structured document panel 906 as shown in FIG. 9. In some embodiments, the user interface relates to the input source 102 or FIGS. 10A-10B are flow diagrams of a method for generating a structured document in a queryable format from an unstructured document according to an embodiment herein. At a step 1002, breakpoints in the unstructured document is identified, using an identifier, based on one or more split points in the unstructured document. In some embodiments, the one or more split points includes at least one of (i) a new line symbol or (ii) a punctuation mark. At a step 1004, the unstructured document is segmented into one or more fragments based on identified breakpoints. At a step 1006, the one or more fragments, using a classifier, are classified as one or more title fragments or one or more non-title fragments based on a sequence of a position of words used in each fragment of the one or more fragments. At a step 1008, a data tree is constructed using the one or more title fragments and the one or more non-title fragments as a node of the data tree based on an order of the one or more title fragments and the one or more non-title fragments in the unstructured document and an importance score of each of the one or more title fragments. At a step 1010, one or more vectors are assigned to each node of the data tree, using a machine learning model, based on an importance of each word and a sequence of words in each node of the data tree. At a step 1012, the structured document is generated by providing matrix representation for each node of the data tree by arranging, using the machine learning model, the one or more vectors of each node of the data tree. The structured document is in queryable format.

In some embodiments, the construction of the data tree comprises (i) arranging the one or more fragments in a same order as the one or more fragments present in the unstructured document, (ii) assigning the one or more non-title fragments that are present after a given title fragment as children to the given title fragment; (iii) assigning the importance score to the one or more title fragments based on a word content in the one or more title fragments, and (iv) assigning a title fragment with a higher importance score as parent of the one or more title fragment with a lower importance score.

In some embodiments, the method further includes creating the one or more vectors to each node of the data tree by (i) identifying the importance of each word of a sentence in each node of the data tree, (ii) determining the one or more vectors based on the sequence of words and the importance of each word of the sentence and a meaning of the sentence using the machine learning model.

In some embodiments, the method further includes (i) removing a word content that is associated with a header and a footer of the unstructured document, in the at least one node of the data tree based on one or more words, and (ii) filtering a list words that are present in each node of the data tree after removing the word content associated with the header and the footer of the unstructured document, to identify the importance of each word in each node of the data tree.

Figure 11:
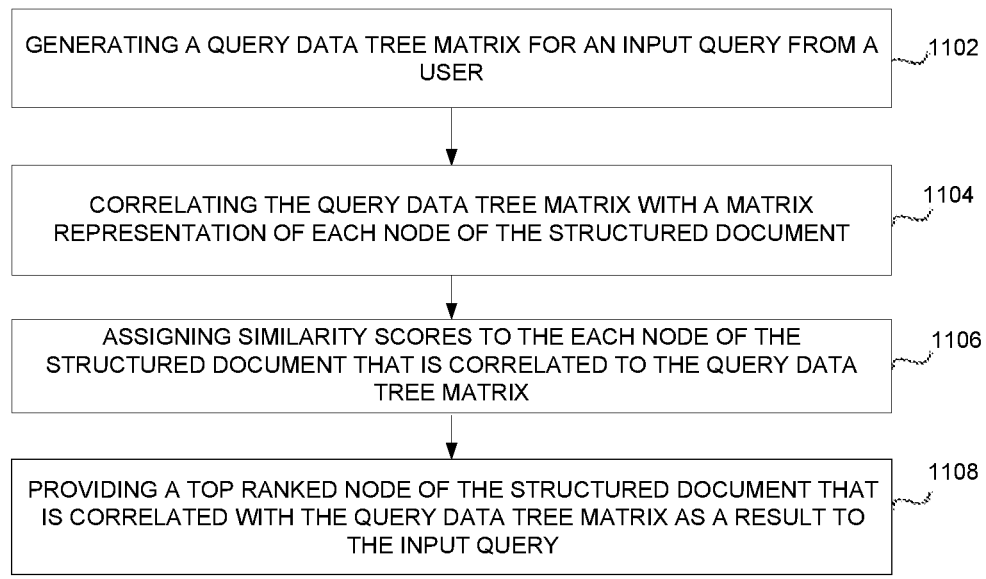
FIG. 11 is a flow diagram of a method for querying a generated structured document based on an input query according to an embodiment herein.

FIG. 11 is a flow diagram of a method for querying a generated structured document based on an input query according to an embodiment herein. At a step 1102, a query data tree matrix is generated for an input query from a user. At a step 1104, the query data tree matrix is correlated with a matrix representation of each node of the structured document. At a step 1106, similarity scores are assigned to each node of the structured document that is correlated to the query data tree matrix. At a step 1108, a top-ranked node of the structured document that is correlated with the query data tree matrix is provided as a result to the input query.

Figure 12:
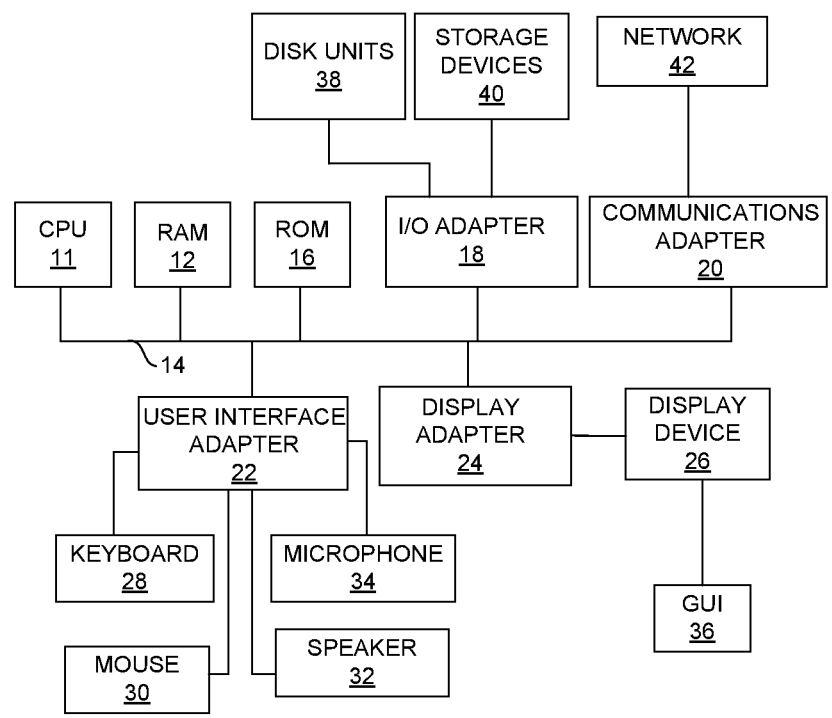
FIG. 12 illustrates a schematic diagram of a generic computer architecture of a structured document generator server in accordance with the embodiments herein.

A representative hardware environment for practicing the embodiments herein is depicted in FIG. 12, with reference to FIGS. 1 through 11. This schematic drawing illustrates a hardware configuration of a structured document generator server 108/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The system provides efficient, fast information access from large documents in various domains like health care, legal, education, and banking. The system helps associates to query relevant legal contracts and also may act as a personal assistant for querying. The system is helpful in managing legal contracts, outsourcing legal processes, due diligence. The system also supports health care experts in querying patient-history repositories interactively. Also, it helps in the fast retrieval of information. In pharmaceutical firms, an integrated model may be set up such that all documents related to drugs are queried at once. The system acts as a companion for researchers in finding papers of relevance. The system helps in analyzing relevant manuals and frequently asked questions. Thus, it helps in accessing information for customers.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for automatically generating a queryable structured document from an unstructured document, said method comprising:
   identifying, using an identifier, breakpoints in the unstructured document, based on a plurality of split points in the unstructured document, wherein the plurality of split points comprise at least one of (i) a new line symbol or (ii) a punctuation mark;
   segmenting the unstructured document into a plurality of fragments based on identified breakpoints;
   classifying, using a classifier, the plurality of fragments as one or more title fragments or one or more non-title fragments based on a sequence of a position of words in each fragment of the plurality of fragments;
   constructing a data tree using the one or more title fragments and the one or more non-title fragments as a node of the data tree based on an order of the one or more title fragments and the one or more non-title fragments in the unstructured document and an importance score of each of the one or more title fragments;
   assigning one or more vectors to each node of the data tree, using a machine learning model, based on an importance of each word and sequence of words in each node of the data tree; and
   generating a structured document by providing matrix representation for each node of the data tree by arranging, using the machine learning model, the one or more vectors of each node of the data tree, wherein the structured document is in a queryable format.

2. The method of claim 1, wherein the method further comprises querying the structured document, by (i) generating a query data tree matrix for an input query from a user; (ii) correlating the query data tree matrix with a matrix representation of each node of the structured document, (ii) assigning similarity scores to each node of the structured document that is correlated to the query data tree matrix; (iii) ranking the each node of the structured document that is correlated with the query data tree matrix based on assigned similarity scores; and (iv) providing a top-ranked node of the structured document that is correlated with the query data tree matrix as a result to the input query.

3. The method of claim 2, wherein the method further comprises comparing, using a similarity score function, a vector of the query data tree matrix and the one or more vectors of each node of the data tree of the structured document for enabling ranking, wherein the similarity score function is a cosine distance function.

4. The method of claim 1, wherein the method further comprises executing the unstructured document to obtain the plurality of split points for identification of the breakpoints in the unstructured document.

5. The method of claim 1, wherein each node of the structured document comprises a value attribute, and a vector attribute, wherein the value attribute stores a word content of at least one title fragment or non-title fragment that is assigned to a given node of the structured document, wherein the vector attribute stores a mathematical representation of the word content of the at least one title fragment or non-title fragment that is assigned to the given node of the structured document.

6. The method as claim 1, wherein the construction of the data tree comprises (i) arranging the plurality of fragments in a same order as the plurality of fragments present in the unstructured document; (ii) assigning the one or more non-title fragments that are present after a given title fragment as children to the given title fragment; (iii) assigning the importance score to the one or more title fragments based on a word content in the one or more title fragments; and (iv) assigning a title fragment with a higher importance score as parent of the one or more title fragment with a lower importance score.

7. The method of claim 1, wherein the method further comprises removing a word content that is associated with a header and a footer of the unstructured document, in the at least one node of the data tree based on a plurality of words and filtering a list words that are present in each node of the data tree after removing the word content associated with the header and the footer of the unstructured document, to identify the importance of each word in each node of the data tree.

8. The method of claim 7, wherein the method further comprises creating the one or more vectors to each node of the data tree by (i) identifying the importance of each word of a sentence in each node of the data tree; (ii) determining the one or more vectors based on the sequence of words and the importance of each word of the sentence and a meaning of the sentence using the machine learning model.

9. One or more non-transitory computer-readable storage medium storing the one or more sequence of instructions, which when executed by the one or more processors, causes to perform a method of automatically generating a queryable structured document from an unstructured document, wherein the method comprises:
identifying, using an identifier, breakpoints in the unstructured document, based on a plurality of split points in the unstructured document, wherein the plurality of split points comprise at least one of (i) a new line symbol or (ii) a punctuation mark;
segmenting the unstructured document into a plurality of fragments based on identified breakpoints;
classifying, using a classifier, the plurality of fragments as one or more title fragments or one or more non-title fragments based on a sequence of a position of words in each fragment of the plurality of fragments;
constructing a data tree using the one or more title fragments and the one or more non-title fragments as a node of the data tree based on an order of the one or more title fragments and the one or more non-title fragments in the unstructured document and an importance score of each of the one or more title fragments;
assigning one or more vectors to each node of the data tree, using a machine learning model, based on an importance of each word and a sequence of words in each node of the data tree; and
generating a structured document by providing matrix representation for each node of the data tree by arranging, using the machine learning model, the one or more vectors of each node of the data tree, wherein the structured document is in a queryable format.

10. A system for generating a queryable structured document from an unstructured document automatically comprising:
a device processor; and
a non-transitory computer-readable storage medium storing one or more sequences of instructions, which when executed by the device processor, causes:
identifying, using an identifier, breakpoints in the unstructured document, based on a plurality of split points in the unstructured document, wherein the plurality of split points comprise at least one of (i) a new line symbol or (ii) a punctuation mark;
segmenting the unstructured document into a plurality of fragments based on identified breakpoints;
classifying, using a classifier, the plurality of fragments as one or more title fragments or one or more non-title fragments based on a sequence of a position of words in each fragment of the plurality of fragments;
constructing a data tree using the one or more title fragments and the one or more non-title fragments as a node of the data tree based on an order of the one or more title fragments and the one or more non-title fragments in the unstructured document and an importance score of each of the one or more title fragments;
assigning one or more vectors to each node of the data tree, using a machine learning model, based on an importance of each word and a sequence of words in each node of the data tree; and
generating a structured document by providing matrix representation for each node of the data tree by arranging, using the machine learning model, the one or more vectors of each node of the data tree, wherein the structured document is in a queryable format.

11. The system of claim 10, wherein the system further performs querying the structured document, by (i) generating a query data tree matrix for an input query from a user; (ii) correlating the query data tree matrix with a matrix representation of each node of the structured document, (ii) assigning similarity scores to each node of the structured document that is correlated to the query data tree matrix; (iii) ranking the each node of the structured document that is correlated with the query data tree matrix based on assigned similarity scores; and (iv) providing a top-ranked node of the structured document that is correlated with the query data tree matrix as a result to the input query.

12. The system of claim 11, wherein the system further compares, using a similarity score function, a vector of the query data tree matrix and the one or more vectors of each node of the data tree of the structured document for enabling ranking, wherein the similarity score function is a cosine distance function.

13. The system of claim 10, wherein the system further performs executing the unstructured document to obtain the plurality of split points for identification of the breakpoints in the unstructured document.

14. The system of claim 10, wherein each node of the structured document comprises a value attribute, and a vector attribute, wherein the value attribute stores a word content of at least one title fragment or non-title fragment that is assigned to a given node of the structured document, wherein the vector attribute stores a mathematical representation of the word content of the at least one title fragment or non-title fragment that is assigned to the given node of the structured document.

15. The system of claim 10, wherein the construction of the data tree comprises (i) arranging the plurality of fragments in a same order as the plurality of fragments present in the unstructured document; (ii) assigning the one or more non-title fragments that are present after a given title fragment as children to the given title fragment; (iii) assigning the importance score to the one or more title fragments based on a word content in the one or more title fragments; and (iv) assigning a title fragment with a higher importance score as parent of the one or more title fragment with a lower importance score.

16. The system of claim 10, wherein the system further removes a word content that is associated with a header and a footer of the unstructured document, in the at least one node of the data tree based on a plurality of words and filters a list of words that are present in each node of the data tree after removing the word content associated with the header and the footer of the unstructured document, to identify the importance of each word in each node of the data tree.

17. The system of claim 10, wherein the system further creates the vector to each node of the data tree by (i) identifying the importance of each word of a sentence in each node of the data tree; (ii) determining the one or more vectors based on the sequence of words and the importance of each word of the sentence and a meaning of the sentence using the machine learning model.

* * * * *